(No Model.)
C. A. ADAMS.
VEHICLE SPRING.
No. 360,839. Patented Apr. 12, 1887.
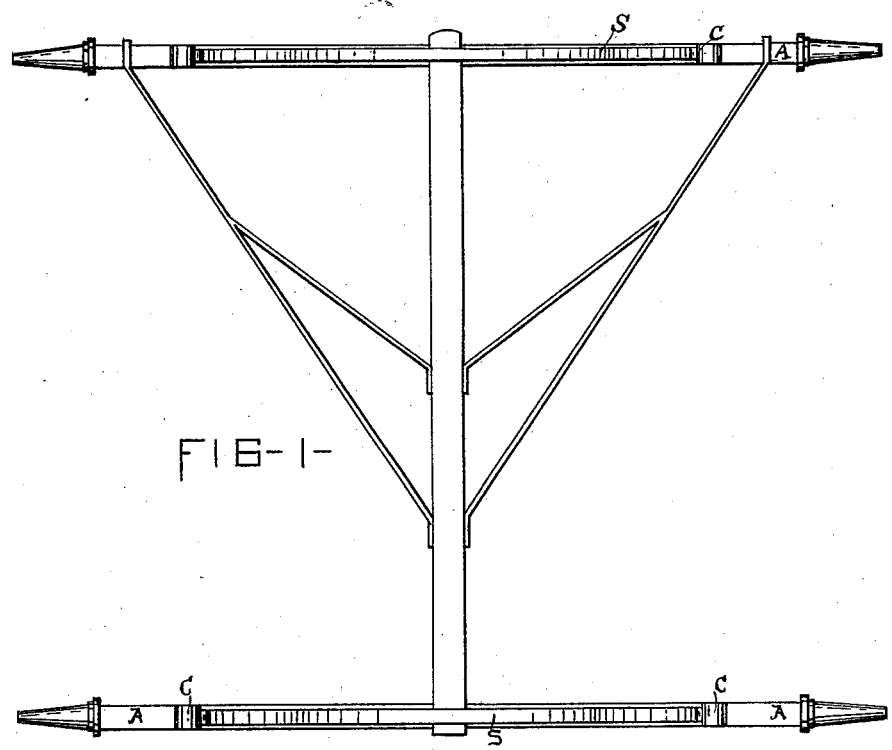
FIG-1-
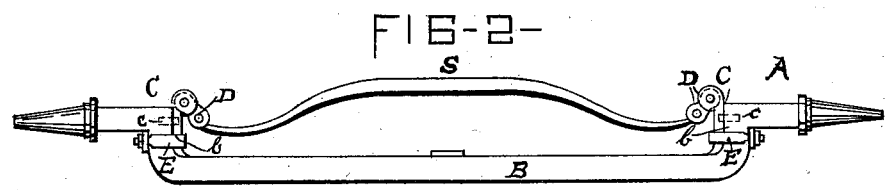
FIG-2-
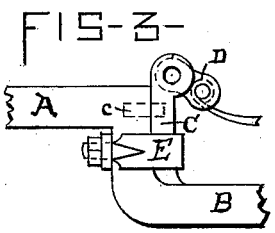
FIG-3-
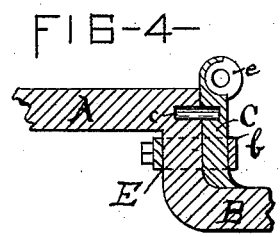
FIG-4-
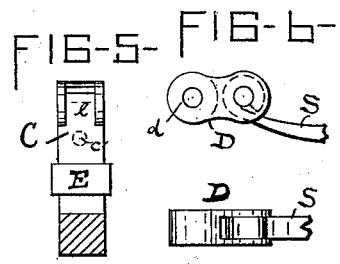
FIG-5- FIG-6-
WITNESSES
A. D. Allen
M. J. Dolphin
INVENTOR
Charles A. Adams
per Hey & Gibbs
Attys.

UNITED STATES PATENT OFFICE.

CHARLES A. ADAMS, OF SYRACUSE, NEW YORK.

VEHICLE-SPRING.

SPECIFICATION forming part of Letters Patent No. 360,839, dated April 12, 1887.

Application filed October 11, 1886. Serial No. 215,850. (No model.)

*To all whom it may concern:*

Be it known that I, CHARLES A. ADAMS, of Syracuse, in the county of Onondaga, in the State of New York, have invented new and useful Improvements in Vehicle-Springs, of which the following, taken in connection with the accompanying drawings, is a full, clear, and exact description.

My invention relates to the type of spring-vehicles in which the axle has a depressed central portion and the spring is supported over said depressed portion.

The object of my invention is to provide improved means of connecting the spring to the axle, so as to secure the same effectually against the play of the spring to the supporting-arms, so as to prevent the same from being wrenched out of position by the deflection and action of the spring.

To this end, then, the invention consists in combining with the depressed axle at the angle formed by the junction of the depressed portion with the axle-supporting portion a spring-supporting arm secured to said portion with steady-pins and clips, and attaching the spring by means of a shackle to the supporting-arm, so that the end of the spring comes at or near the top of the end of the axle proper, all as hereinafter more specifically described, and pointed out in the claims.

In specifying my invention reference is had to the accompanying drawings, in which, like letters indicating corresponding parts in all the figures, Figures 1 is a top plan showing my improvement applied to the running-gear of a vehicle. Fig. 2 shows a side elevation of an axle containing my improvement. Fig. 3 shows an enlarged detached detail showing the method of connecting the spring-supporting arm to the angle between the axle proper and depressed portion. Fig. 4 is a section of the same, showing the steady-pin securing device. Fig. 5 shows a front view of the spring-supporting arm, the depressed portion of the axle being in section; and Fig. 6 shows a side view and top plan, respectively, of the spring-shackle for connecting the spring to the spring-supporting arm.

A is the axle, formed with the depressed central portion, B, the part A terminating with the abrupt offsets *b b*, between A and the depressed portion B.

In the angles formed by the abrupt offsets *b b*, I secure spring-supporting arms C C, constructed as best shown at Figs. 3, 4, and 5. The supporting-arms C abut against the abrupt offsets *b b*, and are secured in the angle by steady-pins *c*, Figs. 3 and 4, passing through the orifice *c'* of C, Fig. 5, into the axle A, as aforesaid, and by clips E, as shown in the drawings. The steady-pins *c* prevent the slipping of the supporting-arms C, while the clips E securely hold C in the angle formed by the offsets *b b*.

The supporting-arms C C, as will be observed upon reference to the drawings, are provided at their upper extremity with eyes *e*, Figs. 4 and 5, said eyes coming slightly above the top of the axle A, and a spring-shackle, D, constructed as shown at Fig. 6, fits into the eye *e*, and brings the end of the spring at or about a level with the top of the axle A.

The spring S is secured to the shackle D, and the shackle is pivoted or coupled into the eye *e* of the supporting-arm C. When pressure is applied to the spring S, depressing the same centrally, the ends secured by the shackle D to the supporting-arm C flatten under the pressure and push against the supporting-arms C C, whereas if the supporting-arms C C were applied to the top of the ends of the axle A, as in prior devices, the tendency of the pressure on the spring B would be to pull the supporting-arms loose and finally wrench them off their support. Besides, by my improvement the spring-supports are brought close down toward the center of the axle, thereby bringing the body of the vehicle very low and convenient for this type of vehicle.

An additional advantage accrues from the use of the spring-shackle D, since the spring has free play on its support, and the ends thereof are brought in the most advantageous position to secure the above desirable results.

Having thus fully described my invention, what I claim as new, and desire to secure by Letters Patent, is—

1. The combination, with the spring S and the axle A, having the depressed portion B and offsets $bb$, and the supporting-arms C, mounted wholly within the angles of the axle A B, against the shoulders formed by the offsets $bb$, and secured to the offsets or upright arms of the axle by the clips E E, substantially as and for the purpose set forth.

2. The combination of the axle A, depressed portion B, spring-supporting arm C, secured to the offset $b$, between A and B, by the steady-pin $c$, and clip E, substantially as specified.

In testimony whereof I have hereunto signed my name, in the presence of two attesting witnesses, at Syracuse, in the county of Onondaga, in the State of New York, this 9th day of October, 1886.

CHARLES A. ADAMS.

Witnesses:
 FREDERICK H. GIBBS,
 E. C. CAMRON.